(12) United States Patent
Bagasra

(10) Patent No.: US 9,860,328 B2
(45) Date of Patent: Jan. 2, 2018

(54) ASSOCIATING WEB PAGE REQUESTS IN A WEB ACCESS SYSTEM

(71) Applicant: Verizon Patent and Licensing Inc., Arlington, VA (US)

(72) Inventor: Abbas Bagasra, Concord, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 272 days.

(21) Appl. No.: 14/674,654

(22) Filed: Mar. 31, 2015

(65) Prior Publication Data

US 2016/0112523 A1    Apr. 21, 2016

Related U.S. Application Data

(60) Provisional application No. 62/065,396, filed on Oct. 17, 2014.

(51) Int. Cl.
| | |
|---|---|
| *G06F 15/16* | (2006.01) |
| *H04L 29/08* | (2006.01) |
| *H04L 29/12* | (2006.01) |
| *G06F 17/30* | (2006.01) |
| *H04L 12/26* | (2006.01) |

(52) U.S. Cl.
CPC ........ *H04L 67/22* (2013.01); *G06F 17/30861* (2013.01); *H04L 43/00* (2013.01); *H04L 61/1511* (2013.01); *H04L 67/02* (2013.01); *H04L 67/04* (2013.01)

(58) Field of Classification Search
None
See application file for complete search history.

(56) References Cited

U.S. PATENT DOCUMENTS

| | | | |
|---|---|---|---|
| 2011/0145316 A1* | 6/2011 | Ait-Ameur | H04L 29/12066 709/203 |
| 2011/0231698 A1* | 9/2011 | Zlati | G06F 11/3006 714/3 |
| 2013/0054747 A1* | 2/2013 | Berman | H04L 69/28 709/218 |
| 2013/0191450 A1* | 7/2013 | Bodenhamer | G06F 17/30899 709/203 |

* cited by examiner

*Primary Examiner* — Younes Naji

(57) ABSTRACT

A computer device may include logic configured to detect a plurality of Domain Name System (DNS) requests and to determine timestamps associated with the plurality of DNS requests. The logic may be further configured to determine that one or more of the plurality of DNS requests correspond to domain shard requests associated with a top DNS request based on the determined timestamps and report the one or more of the plurality of DNS requests as the top domain DNS request based on the one or more of the plurality of DNS requests corresponding to the domain shard requests associated with the top DNS request.

20 Claims, 7 Drawing Sheets

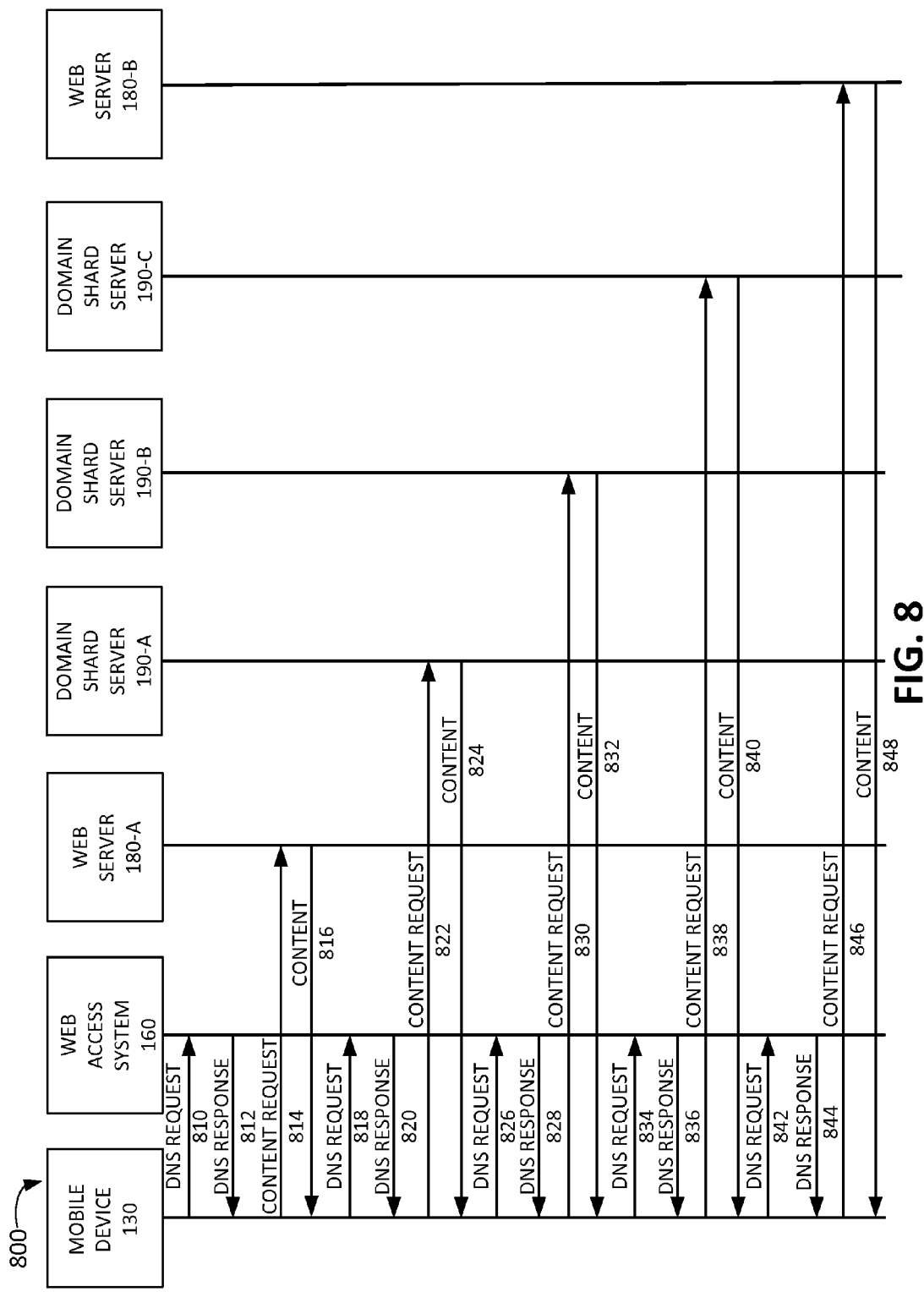

US 9,860,328 B2

ASSOCIATING WEB PAGE REQUESTS IN A WEB ACCESS SYSTEM

BACKGROUND INFORMATION

This patent application claims priority to U.S. Provisional Application No. 62/065,396, entitled "ALGORITHM TO ASSOCIATE HTTP SESSIONS IN A CLOUD BASED PARENTAL CONTROL SYSTEM" and filed on Oct. 17, 2014, which is hereby incorporated by reference in its entirety.

BACKGROUND INFORMATION

A user may connect to the Internet using a local Internet Service Provider (ISP). The user may access the Internet using a web browser. The web browser may send a web page request to a web site using a domain name. The request may first be forwarded to a Domain Name System (DNS) server and the DNS server may resolve the domain name to an Internet Protocol (IP) address. The DNS server may return the IP address to the web browser and the web browser may use the IP address to access the web page at the web site associated with the domain name. The user, and/or the ISP, may seek to keep track of the visited web sites.

BRIEF DESCRIPTION OF THE DRAWINGS

FIG. 8 is an exemplary signal flow diagram according to an implementation described herein.

DETAILED DESCRIPTION OF PREFERRED EMBODIMENTS

Figure 1:
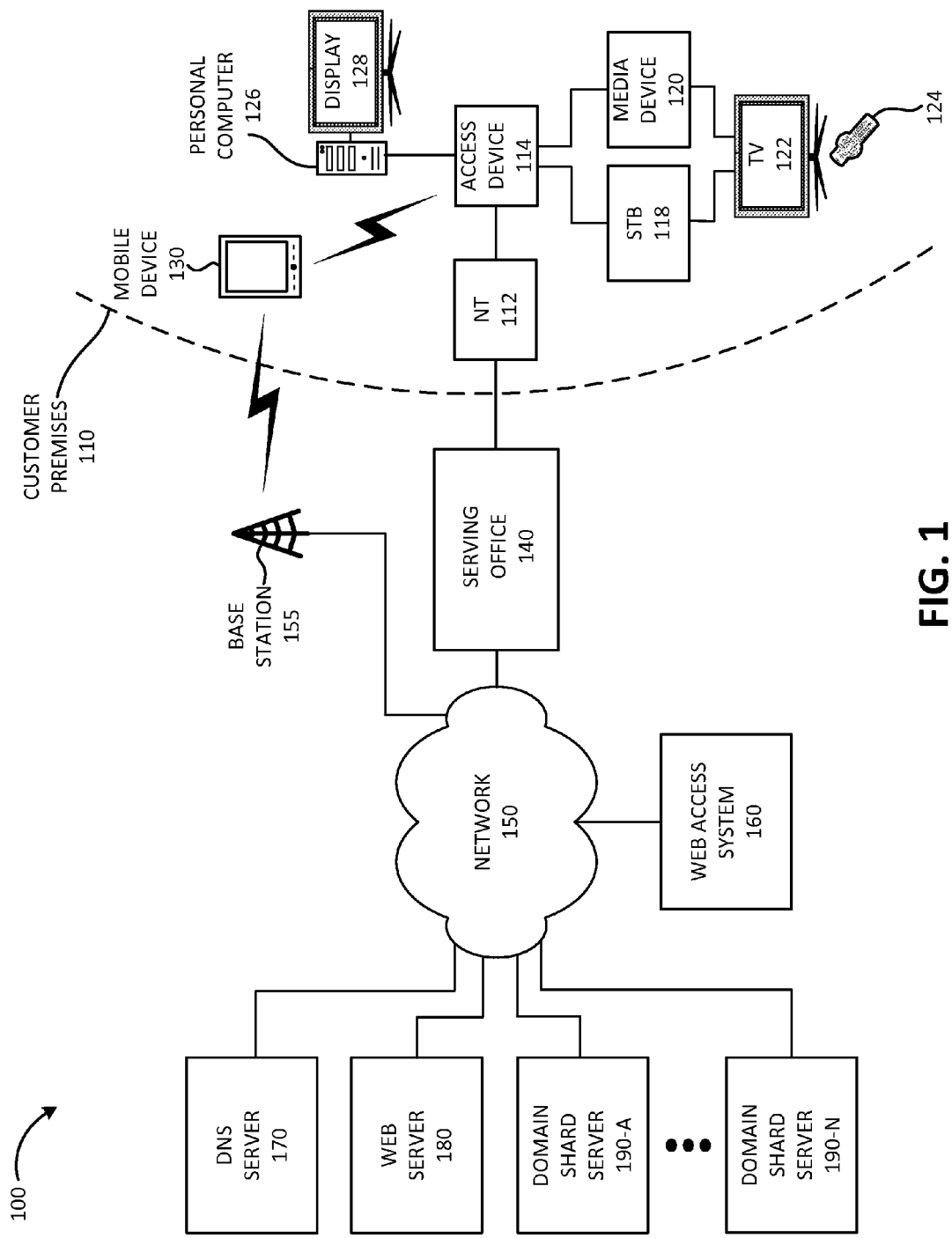
FIG. 1 is a diagram illustrating an environment according to an implementation described herein.

The following detailed description refers to the accompanying drawings. The same reference numbers in different drawings identify the same or similar elements.

A web access system may manage web access for devices associated with a particular customer account. For example, a provider of communication services, such as an Internet Service Provider (ISP) may assign a customer account to a customer premises location (e.g., a home location, a work location, etc.) associated with a data connection. Users may use various devices to connect to the Internet via the data connection to the customer premises location. The web access system may implement various policies for the customer account with respect to Internet access and may keep track of which web sites were visited, as well as how often a particular web site was visited, by devices associated with the customer's account.

For example, a parent may set up parental rules for the account, such as limiting which web sites that a child is allowed to visit using the minor's device (e.g., mobile phone, tablet, etc.). Furthermore, the parent may wish to keep track of how often the child visits particular web sites and/or may limit how often and/or how long the child is allowed to visit a particular web site or web sites in a particular category. For example, a child may be granted unlimited access to educational web sites, but may be limited in the number of times the child is allowed to visit a social media website. Moreover, a user may wish to keep track of other types of information, such as how often a particular web site, and/or web sites in a particular category, are visited by all users associated with the customer account. Thus, the web access system may be configured to generate a report that includes a hit-count per user, per category and per web site, as well as other types of metrics.

In order to generate an accurate hit count for a particular web site and/or web page, the web access system may count the number of Domain Name System (DNS) queries received from devices associated with the customer premises account. When a browser (or another type of application), request content from a web site, the browser generates a DNS query to resolve a domain name to an Internet Protocol (IP) address and sends the DNS query to a DNS server. After the browser receives the requested IP address from the DNS server, the browser may connect to the web site using the received IP address in order to request content from the web site. In response, the web site may return a landing page.

The landing page may include a large number of individual resources. For example, an average landing page may include over 90 different resources. If the individual resources are delivered sequentially to render the landing page in the browser, rendering the page may result in significant delay that degrades the user experience. Therefore, a web site may use a "domain shard" approach to provide the web page content to a browser. Each domain shard may correspond to a different domain to which the landing page points for a particular resource to be included in the web page.

Thus, when the browser receives the web page, the browser may need to access the different domain shard to fetch content for the web page. For example, an average landing page may point to 16 different domains. Each of the domain shards may correspond to a different server, such as a Content Delivery Network (CDN) server, an advertisement server, a tracking server, and/or another type of server. The browser may need to generate a DNS query for each domain shard associated with the web page, in order to resolve the IP address for the domain shard and generate an independent Hypertext Transfer Protocol (HTTP) request to obtain the content from the domain shard to be included in the web page being rendered by the browser. As the browser uses parallel downloading of the resources, a domain shard approach may result in a faster rendering time for the web page.

However, the domain shards may interfere with an accurate tracking of visited web sites for a web access system. For example, the web access system may count the DNS queries for the domain shards as web page requests made by a user, even though a user did not make web page requests for the domain shards. Furthermore, the domain shard DNS queries may not carry any information to help associate a domain shard with a corresponding web page associated with an original DNS query resulting from a user action. For example, a domain shard may be associated with an obscure CDN server name (e.g., cdn301.dgxsite.com, etc.). Moreover, two users associated with a same customer premises and/or customer account may be making independent requests to a same web site and each request may generate a set of domain shard requests. Additionally, multiple web access systems may be handling DNS requests from the same customer premises and different web access systems may handle different domain shard DNS requests associated with the same original DNS query for a web site.

Implementations described herein relate to associating web page requests in a web access system. In particular, the web access system may identify domain shard DNS queries associated with a top domain DNS query corresponding to a web page requested by a user. A "top domain" DNS query, also referred to herein as a top domain DNS request, refers to a DNS request or query generated by a browser in response to a user action to navigate to a new web page. A "domain shard" DNS query, also referred to herein as a domain shard DNS request, refers to a DNS request or query generated by a browser in response to an instruction included in a web page to fetch content, to be included in the rendered web page, from a server identified by a domain shard name included in the domain shard DNS request.

A computer device associated with the web access system may detect a group of DNS requests associated with a particular customer premises and/or customer account, may determine timestamps associated with the group of DNS requests, and may determine that one or more of the group of DNS requests correspond to domain shard requests associated with a top domain DNS request based on the determined timestamps. The computer device may then report the domain shard requests as associated with the top domain DNS request. Thus, the domain shard requests may not be counted as separate web page requests.

Furthermore, the computer device may group DNS requests associated with a customer premises into lists based on users and/or devices and may store entries in the lists based on the timestamps associated with the DNS requests. A maximum page load time may be initialized based on an estimated time to render a web page in an average browser. For example, in some implementations, the initial maximum page load time may be set to 800 milliseconds (ms). In other implementations, a different value for the maximum page load time may be selected.

The computer device may select a list and may designate a first DNS request in the list as the top domain DNS request. The computer device may then select the second DNS request from the list and may determine whether the timestamp for the top domain DNS request and the timestamp for the second DNS request differ by an amount less than the maximum page load time. If the time difference is less than the maximum page load time, the second DNS request may be added to the domain shard list for the top domain DNS request. The process may continue to the next entry in the list, by comparing the timestamps of the second DNS request and the third DNS request, and may be continued until the last DNS entry in the list.

If the time difference is greater than the maximum page load time, the second DNS request may be selected as a new top domain DNS request and a new domain shard list may be started. For example, if the fifth DNS entry in the list and the sixth DNS entry have timestamps that differ by more than the maximum page load time, the sixth DNS entry may be designated as a new top domain DNS entry and a new domain shard list may be started for the new top domain DNS entry, starting with the comparison of the timestamps of the sixth DNS entry and the seventh DNS entry. Thus, a time period greater than the maximum page load time between DNS requests may indicate that a first requested web page has finished generating domain shard requests and any subsequent DNS requests are associated with another event, such as the user selecting another web page.

Furthermore, implementations described herein relate to adjusting a maximum page load time over time. For example, in some implementations, the maximum page load time may be adjusted each time a new top domain DNS request is processed. In other implementations, the maximum page load time may be adjusted based on a different criterion. A DNS request counter may be maintained and if the counter is less than a counter threshold, a simple moving average for the maximum page load time may be computed based on the total page load time for each requested web page. The total page load time may be computed based on the timestamp difference of the top domain DNS request and the last domain shard DNS request associated with the top domain DNS request. After a particular number of web page requests, based on the counter threshold, an adjusted maximum page load time may be computed using an exponential moving average.

FIG. 1 is a diagram of an exemplary environment 100 in which systems and/or methods, described herein, may be implemented. As shown in FIG. 1, environment 100 may include a customer premises 110, a serving office 140, a network 150, a web access system 160, a DNS server 170, a web server 180, and one or more domain shard servers 190-A to 190-N (referred to herein collectively as "domains shard servers 190" and individually as "domain shard server 190").

Customer premises 110 may include a particular location (or multiple locations) associated with a customer. For example, customer premises 110 may include the customer's home, a customer's place of business, and/or another type of location associated with a customer. Customer premises 110 may include a network terminal (NT) 112, an access device 114, a set top box (STB) 118, a media device 120, a television 122, a remote control 124, a personal computer 126, a display 128, and a mobile device 130.

NT 112 may receive content from serving office 140 via a connection, such as, for example, a fiber-optic cable connection, a coaxial cable connection, a wireless connection, and/or another type of connection. Furthermore, NT 112 may send information from serving office 140 to access device 114 and/or from access device 114 to serving office 140. In one implementation, NT 112 may include an optical network terminal and NT 112 and serving office 140 may form part of a high-speed fiber optic network. In another implementation, NT 112 may include a cable modem. In yet another implementation, NT 112 may include a fixed wireless transceiver, a WiFi access point, and/or a Bluetooth device. Additionally or alternatively, NT 112 may include a layer 2 and/or layer 3 network device, such as a switch, router, firewall, and/or gateway. Customer premises 110 may receive one or more services via the connection between NT 112 and video serving office 140, such as, for example, a television service, Internet service, and/or voice communication (e.g., telephone) service.

Access device 114 may include a network device configured to function as an access device for devices in customer premises 110. Access device 114 may function as a switch and/or home broadband router (HBR) for the devices in customer premises 110. Furthermore, access device 114 may function as a wireless access point (e.g., WiFi access point) for devices in customer premises 110. Access device 114 may support different types of interfaces, such as an Ethernet interface, a WiFi interface, and/or a Multimedia over Coaxial Alliance (MoCa) interface.

STB 118 may receive content and output the content to television 122 for display. STB 118 may include a component (e.g., a cable card or a software application) that interfaces with (e.g., plugs into) a host device (e.g., a personal computer, television 122, a stereo system, etc.) and allows the host device to display content. STB 118 may also be implemented as a home theater personal computer (HTPC), an optical disk player (e.g., digital video disk (DVD) or Blu-Ray™ disc player), a cable card, etc. STB 118 may receive commands and/or other type of data from other devices, such as remote control 124, and may transmit the data to other devices in customer premises 110.

Media device 120 may include a digital media player (e.g., Apple TV, Google Chromecast, Amazon Fire TV, etc.) configured to stream digital media files (e.g., video files, audio files, images, etc.) from personal computer 126, mobile device 130, NT 112, and/or another device via a wired connection or via a wireless connection (e.g., WiFi, etc.) with access device 114. Media device 120 may include smart television features that enable media device 120 to support add-on applications, such as a web browser that enables a user to browse web pages using television 122. In some implementations, media device 120 may correspond to a High Definition Multimedia Interface (HDMI) dongle media device connected into a HDMI port of television 122. In some implementations, media device 120 may correspond to a gaming system (e.g., Microsoft XBOX, Sony Playstation, etc.).

Television 122 may output content received from STB 118 and/or from media device 120. Television 122 may include speakers as well as a display. In some implementations, television 122 may correspond to a smart television that supports add-on applications (e.g., a web browser) and/or is configured to communicate with other devices over an Internet Protocol (IP) connection and/or another type of network connection.

Remote control 124 may issue wired or wireless commands for controlling other electronic devices, such as television 122, media device 120, and/or STB 118. Remote control 124, in conjunction with television 122, media device 120, STB 118, and/or access device 114, may allow a customer to interact with an application running on television 122, media device 120, STB 118, and/or access device 114. Other types of devices (e.g., a keyboard, mouse, mobile phone, etc.) may be used instead of, or in addition to, remote control 124, in order to control television 122, media device 120, STB 118, and/or access device 114.

Personal computer 126 may include a desktop computer, a laptop computer, a tablet computer, and/or another type of computation and/or communication device. Personal computer 126 may include a microphone to capture audio, a camera to capture images or video. Personal computer 126 may include display 128 for displaying images and/or video content received from access device 114, STB 118, and/or media device 120. Personal computer 126 may also include a speaker for playing audio signals.

Mobile device 130 may include a portable communication device (e.g., a mobile phone, a smart phone, a phablet device, a wearable computer device, a global positioning system (GPS) device, and/or another type of wireless device); a laptop computer, a tablet computer, or another type of portable computer; a media playing device; a portable gaming system; and/or any other type of mobile computer device with communication and output capabilities. Mobile device 130 may communicate with network 150 via base station 155. Furthermore, mobile device 130 may communicate with devices in customer premises 110 using a wireless connection via access device 114 and/or directly using a short-range wireless method (e.g., Bluetooth, Near Field Communication (NFC), etc.). While FIG. 1 shows a single mobile device 130 for illustrative purposes, in practice, customer premises 110 may include multiple mobile devices 130. Furthermore, different mobile devices 130 may be associated with different users.

Serving office 140 may include one or more devices, such as computer devices and/or server devices, which ingest content, store content, format content, and/or deliver content to customer premises 110. For example, serving office 140 may provide television channels and/or other type of content from a video content delivery system. Furthermore, serving office 140 may provide a connection service to network 150 for customer premises 110 and act as an ISP for customer premises 110 with respect to network 150.

Network 150 may include one or more circuit-switched networks and/or packet-switched networks. For example, network 150 may include a local area network (LAN), a wide area network (WAN), a metropolitan area network (MAN), a Public Switched Telephone Network (PSTN), a satellite-based network, an ad hoc network, an intranet, the Internet, a fiber optic-based network, a wireless network, and/or a combination of these or other types of networks. Network 150 may include base station 155. Base station 155 may function as a base station that enables wireless devices in customer premises 110, such as mobile device 130, to communicate with network 150. For example, base station 155 may include a Long Term Evolution eNodeB base station, a Global System for Mobile Communications (GSM) base station, a Code Division Multiple Access (CDMA) base station, and/or another type of base station.

Web access system 160 may include one or more devices, such as computer devices and/or server devices, which receive requests to access web sites from devices associated with customer premises 110 (e.g., STB 118, media device 120, personal computer 126, mobile device 130, etc.). For example, serving office 140, and/or base station 155, may forward a DNS request from a device associated with customer premises 110 to web access system 160. Web access system 160 may apply one or more access rules to the DNS request based on a user profile associated with a particular device from which the request was received. Furthermore, web access system 160 may track the received DNS requests to determine which web pages have been requested and/or how many times a particular web page, a particular web site, and/or a particular category of web pages has been requested by a particular user and/or device. In tracking the DNS requests, web access system 160 may identify domain shard DNS queries associated with a top domain DNS query corresponding to a web page requested by a user.

In some implementations, web access system 160 may also function as a DNS server. Thus, web access system 160 may resolve a DNS query to an IP address and may return the IP address associated with the DNS query to the requesting device. In other implementations, web access system 160 may forward DNS queries to DNS server 170. DNS server 170 may send a DNS query to an IP address and may return the IP address associated with the DNS query to the requesting device.

Web server 180 may maintain web pages that include domain shard content. A user may request a web page stored by web server 180 and web server 180 may provide the web page to the user. The web page may point to one or more resources (e.g., text, images, audio files, video files, scripts, etc.) stored in domain shard servers 190. Each domain shard server 190 may store one or more resources associate with a web page stored in web server 180. When a browser receives the web page from web server 180, the browser may request the domain shard resources to which the web page points from particular ones of domain shard servers 190.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Furthermore, while FIG. 1 shows a single customer premises 110, a single serving office 140, a single network 150, a single web access system 160, a single DNS server 170, and a single web server 180 for illustrative purposes, in practice, environment 100 may include multiple customer premises 110, multiple serving offices 140, multiple networks 150, multiple web access systems 160, multiple DNS servers 170, and/or multiple web servers 180. For example, a serving office 140 may connect to a large number of customer premises 110 and a provider of telecommunication services may manage a large number of serving offices 140. Moreover, the provider of telecommunication services may manage multiple web access systems 160, which may be distributed across network 150 or across multiple networks 150. For example, the processing load for multiple web access systems 160 may be distributed and thus different DNS requests from customer premises 110 may be processed by different web access systems 160. One of the web access systems 160, or a different type of reporting system, may collect information from the multiple web access systems 160 to generate a report for web access statistics for customer premises 110.

Figure 2:
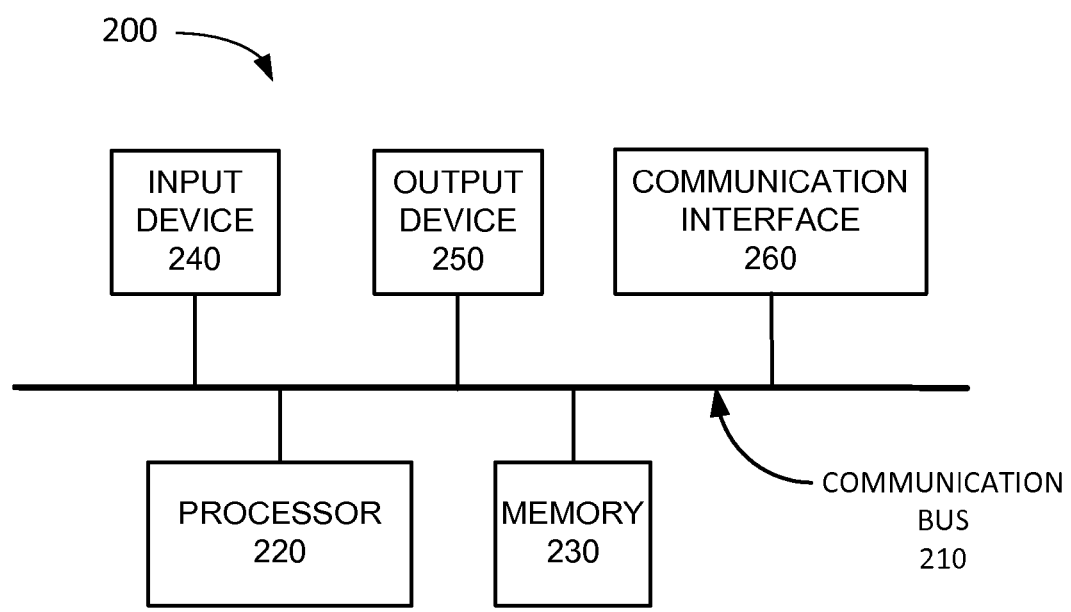
FIG. 2 is a diagram illustrating exemplary components of the web access system of FIG. 1.

FIG. 2 is a diagram illustrating exemplary functional components of device 200 according to an implementation described herein. Web access system 160, serving office 140, mobile device 130, personal computer 126, STB 118, access device 114, NT 112, and/or base station 155 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to associating web page requests. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than those depicted in FIG. 2. Additionally or alternatively, one or more components of device 200 may perform one or more tasks described as being performed by one or more other components of device 200.

Figure 3:
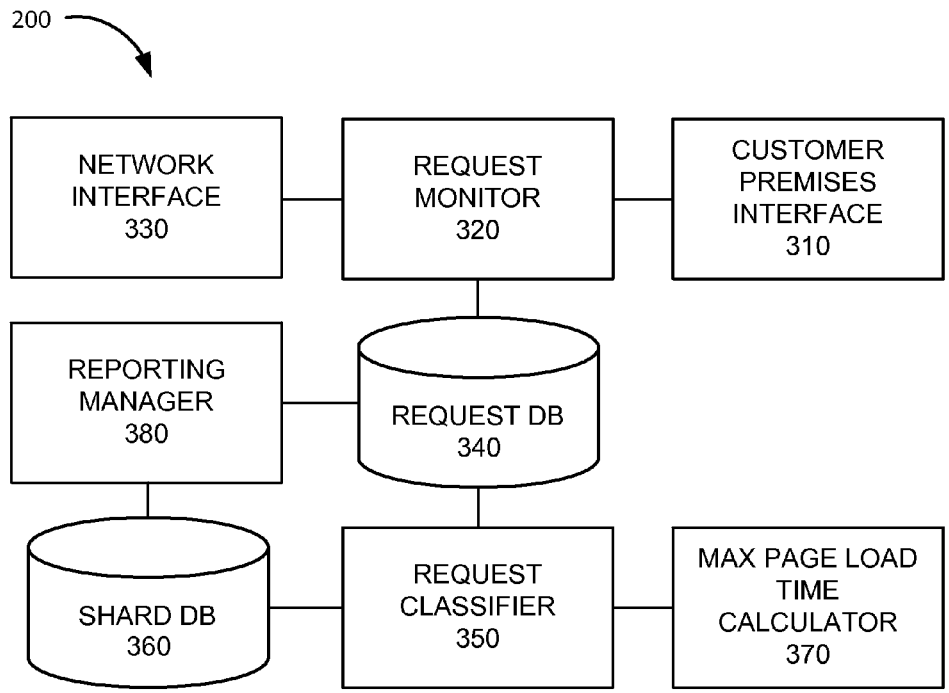
FIG. 3 is a diagram illustrating exemplary functional components of web access system of FIG. 1.

FIG. 3 is a diagram illustrating exemplary functional components of device 200 according to an implementation described herein. The functional components of device 200 may be implemented, for example, via processor 220 executing instructions from memory 230. Alternatively, some or all of the functional components of device 200 may be implemented via hard-wired circuitry. As shown in FIG. 3, the functional components of device 200 may include a customer premises interface 310, a request monitor 320, a network interface 330, a request database (DB) 340, a request classifier 350, a shard DB 360, a maximum page load time calculator 370, and a reporting manager 380.

Customer premises interface 310 may interface with devices associated with customer premises 110 via serving office 140 (and/or via base station 155). For example, customer premises interface 310 may receive a DNS request from a device associated with customer premises 110 and may return an IP address associated with the DNS request to the device.

Request monitor 320 may monitor DNS requests received from devices associated with customer premises 110. For example, request monitor 320 may receive a DNS request via customer premises interface 310, may identify the particular customer premises 110 associated with the DNS request, may identify a particular device and/or user associated with the DNS request, may record a timestamp associated with the DNS request, and may store information relating to the DNS request in request DB 340. In some implementations, the DNS request may correspond to an Extension Mechanisms for DNS (EDNS) request that includes a field for identifying the requesting device. The device (and/or user associated with the device) may be identified based on a Media Access Control (MAC) address included in the EDNS request. If the device includes multiple user accounts, the EDNS request may also include information identifying a particular user account. Request monitor 320 may forward the received DNS requests to network interface 330 for processing.

Furthermore, request monitor 320 may apply one or more policies to the DNS request based on information stored in a policy DB (not shown in FIG. 3). For example, if the device is associated with a child that is not permitted to access web sites in particular categories (e.g., adult content), and the DNS request is associated with a web site in one of the particular categories, the DNS request may be rejected.

Network interface 330 may interface with devices via network 150. For example, in some implementations, network interface 330 may forward DNS requests to DNS server 170. In other implementations, network interface 330 may receive registrations from web server 180 and/or domain shard servers 190 and may associate an IP address with a domain name for web server 180 and/or domain shard servers 190. In implementations in which web access system 160 functions as a DNS server, network interface 330 may interface with a DNS DB (not shown in FIG. 3).

Request DB 340 may store information relating to received DNS requests. Exemplary information that may be stored in request DB 340 is described below with reference to FIG. 4. Request classifier 350 may determine whether a particular DNS request corresponds to a domain shard request and/or whether a particular DNS request corresponds to a top domain request. If a DNS request corresponds to a domain shard DNS request, request classifier 350 may classify the domain shard request with an associated top domain DNS request. Request classifier 350 may store identified domain shard lists in shard DB 360. For example, shard DB 360 may store a list that includes a top domain DNS query and the identified domain shard DNS queries associated with the top domain DNS query. The information in shard DB 360 may also be used to update request DB 340 to designate DNS requests stored in request DB 340 as domain shard DNS requests.

In some implementations, shard DB 360 may further store a list of domain names that have been identified as domain shard names and may check a domain shard DNS query against the list of identified domain shard names. If a domain name has been included in the list of domain shard names, a DNS query that includes the identified domain shard name may be confirmed as domain shard DNS query and a need to perform a timestamp comparison may be avoided in order to reduce processing time.

Maximum page load time calculator 370 may calculate an adjusted maximum page load time in response to a particular trigger condition. For example, in some implementations, an adjusted maximum page load time may be calculated in response to a new top domain DNS query being detected. In other implementations, an adjusted maximum page load time may be calculated based on another type of triggering condition.

Reporting manager 380 may report web page access statistics associated with customer premises 110 at particular intervals (e.g., once a day, once a week, in response to a request for the statistics by the customer, etc.). Reporting manager 380 may exclude domain shard DNS requests from any web site access counts. Thus, reporting manager 380 may report a top domain DNS request, and the domain shard DNS requests associated with the top domain DNS request, as a single web page request.

Although FIG. 3 shows exemplary functional components of device 200, in other implementations, device 200 may include fewer functional components, different functional components, differently arranged functional components, or additional functional components than depicted in FIG. 3. Additionally or alternatively, one or more functional components of device 200 may perform functions described as being performed by one or more other functional components of device 200.

Figure 4:
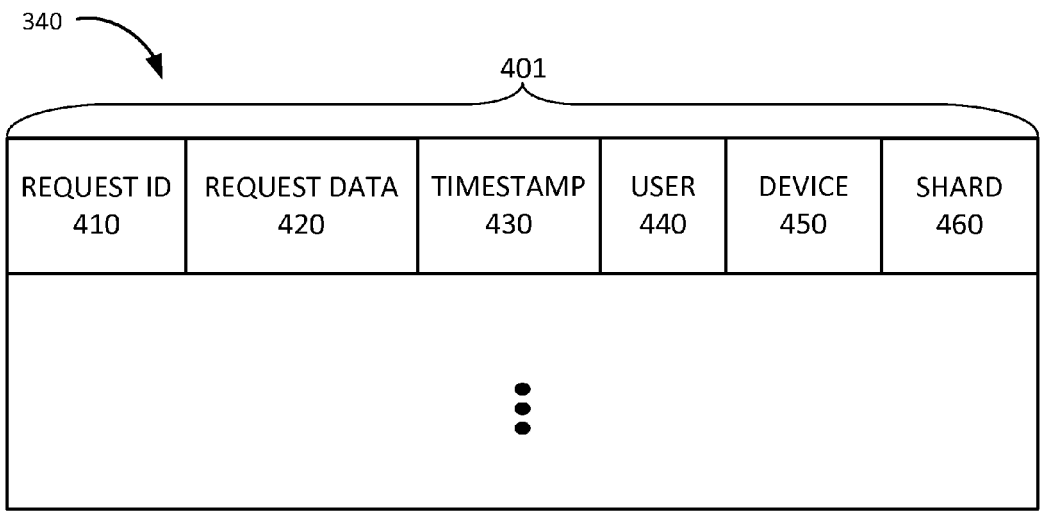
FIG. 4 is a diagram illustrating exemplary components that may be stored in the request database of FIG. 3.

FIG. 4 is a diagram illustrating exemplary components that may be stored in request DB 340. As shown in FIG. 4, request DB 340 may include one or more request entries 401. Each request entry 401 may store information relating to a particular DNS request detected by request monitor 320 from customer premises 110. Request entry 401 may include a request identifier (ID) field 410, a request data field 420, a timestamp field 430, a user field 440, a device field 450, and a shard field 460.

Request ID field 410 may store an identifier (e.g., a string of alphanumeric characters) that uniquely identifies a DNS request. Request data field 420 may store data associated with the DNS request, such as the domain name for which the IP address is being requested. Timestamp field 430 may store a timestamp that identifies the time and date at which the DNS request was received.

User field 440 may identify a user associated with the DNS request. The user may be identified based on the device from which the DNS request was received and/or based on a user account associated with the device. Device field 450 may include information identifying the device from which the DNS request, such as a name assigned to the device and/or a MAC address associated with the device.

Shard field 460 may store information identifying whether the DNS request corresponds to a top domain DNS request or a domain shard DNS request. If the DNS request corresponds to a domain shard DNS request, shard field 460 may store information identifying the top domain DNS request with which the domain shard DNS request is associated.

Although FIG. 4 shows exemplary components that may be stored in request DB 340, in other implementations, request DB 340 may store fewer components, different components, differently arranged components, or additional components than depicted in FIG. 4. Furthermore, in some implementations, request DB 340 may include a distributed data structure shared by multiple web access systems 160 and managed via a consensus protocol (e.g., PAXOS, etc.).

Figure 5:
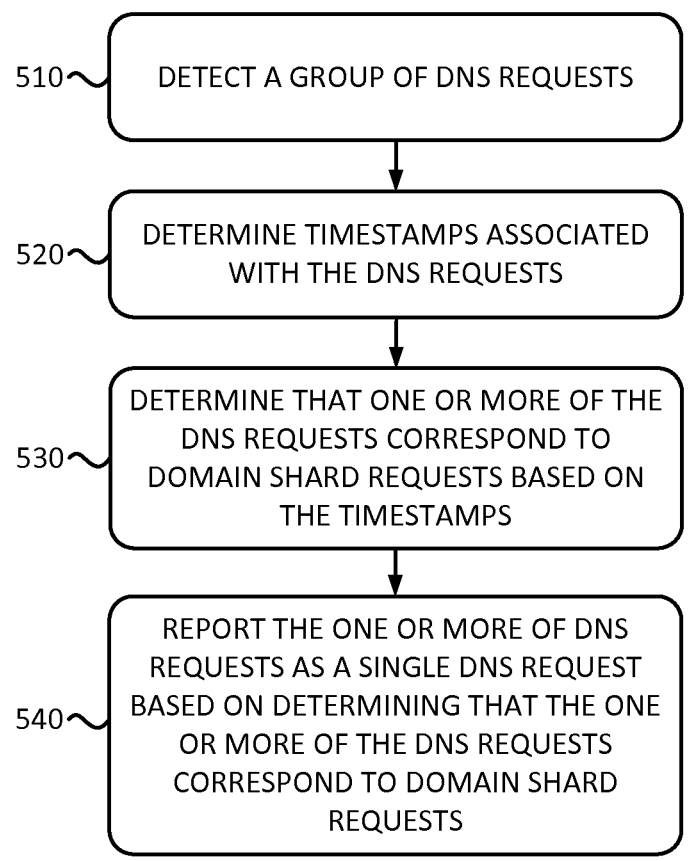
FIG. 5 is a flowchart of a first process for detecting domain shard requests according to an implementation described herein.

FIG. 5 is a flowchart of a first process for detecting domain shard requests according to an implementation described herein. In some implementations, the process of FIG. 5 may be performed by web access system 160, either individually or in combination. In other implementations, some or all of the process of FIG. 5 may be performed by another device or a group of devices separate from these devices. For example, some or all of the blocks of process of FIG. 5 may be performed by base station 155, NT 112, and/or access device 114.

The process of FIG. 5 may include detecting a group of DNS requests (block 510) and timestamps associated with the DNS requests may be determined (block 520). For example, web access system 160 may receive DNS requests from devices associated with customer premises 110, such as, for example, STB 118, media device 120, TV 122, personal computer 126, mobile device 130, and/or another device associated with customer premises 110. Web access system 160 may store the received DNS requests in request DB 340 along with a timestamp for each received DNS request.

A determination may be made that one or more of the DNS requests correspond to domain shard requests based on the timestamps (block 530) and the one or more of the DNS requests may be reported as a single DNS request based on determining that the one or more DNS requests correspond to domain shard requests (block 540). For example, web access system 160 may sort the DNS requests into a list based on timestamps and may compare adjacent or consecutive DNS requests in the list to determine whether the difference in the timestamps between the adjacent DNS requests is less than a maximum page load time. If the difference is less than the maximum page load time, the adjacent DNS requests may be placed into a same domain shard list. If the difference is greater than the maximum page load time, the DNS request, of the pair of adjacent DNS requests being compared, with the later timestamp is used to start a new domain shard list. In each domain shard list, the DNS request with the earliest timestamp is designated as the top domain DNS request for the domain shard list and only the top domain DNS requests are reported by web access system 160 as web page requests.

Web access system 160 may report the web page request statistics at particular intervals, in response to a request by the customer, in response to a request by an administrator of web access system 160, and/or in response to a different type of trigger event. Web access system 160 may report the web page request statistics to serving office 140, to a device in customer premises 110 (e.g., STB 118, personal computer 126, mobile device 110, etc.), and/or to a centralized reporting system that collects data from multiple web access systems 160 (which may be one of web access systems 160 or another type of system).

Figure 6:
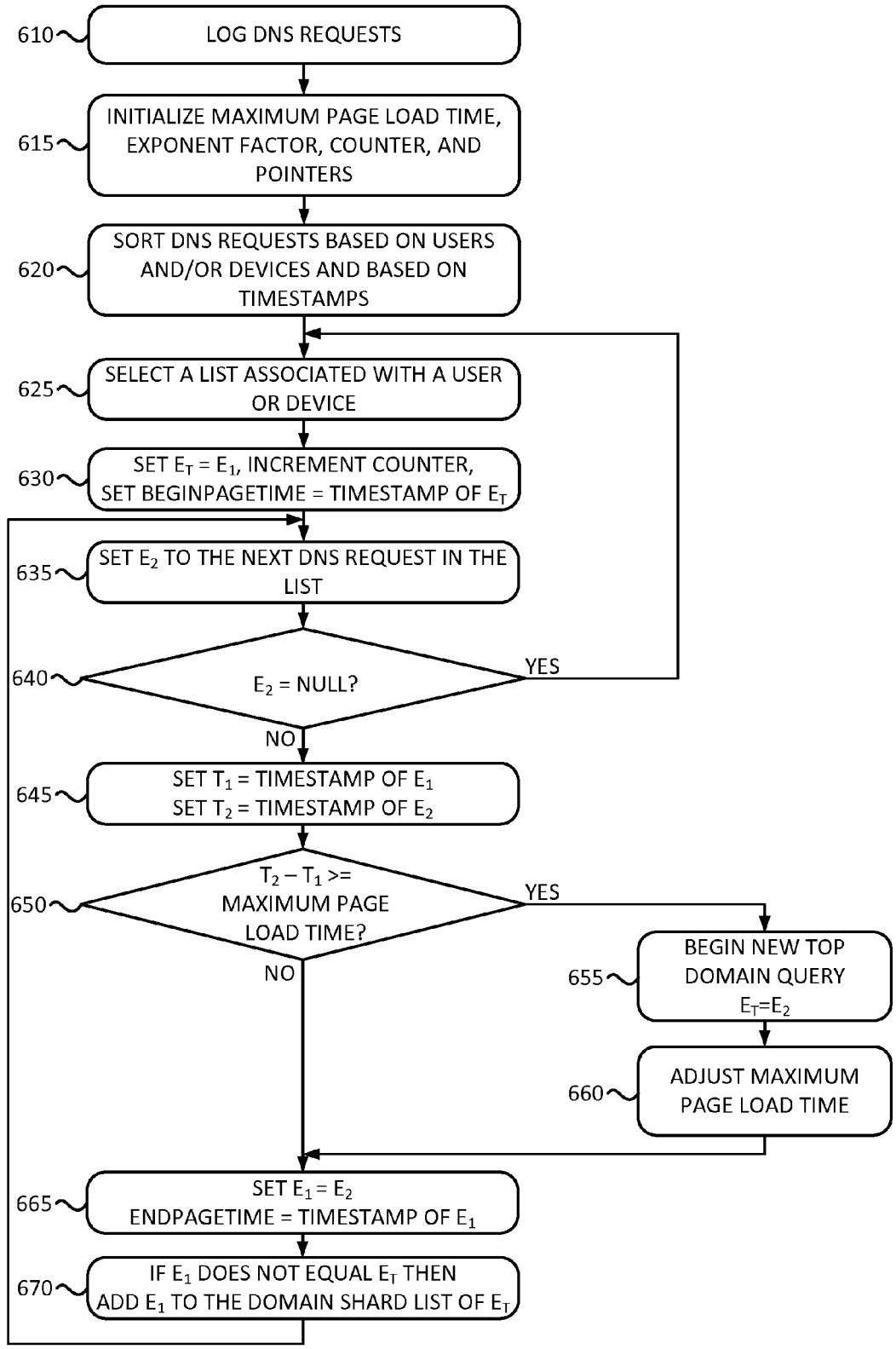
FIG. 6 is a flowchart of a second process for detecting domain shard requests according to an implementation described herein.

FIG. 6 is a flowchart of a second process for detecting domain shard requests according to an implementation described herein. In some implementations, the process of FIG. 6 may be performed by web access system 160, either individually or in combination. In other implementations, some or all of the process of FIG. 6 may be performed by another device or a group of devices separate from these devices. For example, some or all of the blocks of process of FIG. 6 may be performed by base station 155, NT 112, and/or access device 114.

The process of FIG. 6 may include logging DNS requests (block 610). For example, request monitor 320 may receive DNS requests from devices associated with customer premises 110, such as, for example, STB 118, media device 120, TV 122, personal computer 126, mobile device 130, and/or another device associated with customer premises 110, and may store the received DNS requests, along with a timestamp for each received DNS request, in request DB 340.

A maximum page load time, an exponent factor, a counter, and pointers may be initialized (block 615). Web access system 160 may maintain a set of variables used to carry out the process of identifying top domain DNS requests and domain shard DNS requests. Web access system 160 may initialize a maximum page load time value. The maximum page load time may be used as an estimation of the maximum time it takes to render a web page in a browser. Thus, a DNS request received after a maximum page load time from a previous DNS request may be designated as a separate web page request. As an example, the maximum page load time may be set to 800 milliseconds. It should be understood that other maximum page load times may be set based on the particular conditions of environment 100. Web access system 160 may initialize an exponent factor variable and a counter that may be used in computing an adjusted maximum page load time (explained below with reference to FIG. 7). Furthermore, web access system 160 may initialize a set of pointers used to process a list of DNS requests: an $E_T$ pointer to point to a current top domain DNS request, an $E_1$ pointer to point to a previous DNS request being compared, and an $E_2$ pointer to point to a current DNS request being compared. Initially, $E_1$ may be set to point to the first DNS request in a list of DNS requests associated with a user and/or device, corresponding to a first top domain DNS request associated with the user and/or device. $E_T$ and $E_2$ may be initially set to a null value.

The logged DNS requests may be sorted based on users and/or devices and based on timestamps (block 620). For example, web access system 160 may sort the logged DNS requests based on devices and/or users associated with customer premises 110. For example, if devices are assigned to particular users, and/or if a particular device includes multiple user accounts, web access system 160 may sort the DNS requests based on users. Otherwise, web access system 160 may sort the DNS requests based on devices from which the DNS requests originated. The users and/or devices associated with particular DNS requests may be identified based on information includes in the DNS requests, such as a user account identifier, a MAC address associated with a device, and/or other types of identifying information. For each list associated with a user/device, the DNS requests may be sorted based on timestamps, starting with the earliest timestamp and ending with the most recent timestamp.

A list associated with a user or device may be selected (block 625) and $E_1$ may be set to the first DNS request in the selected list, $E_T$ may be set to $E_1$, the counter may be incremented, and a BeginPageTime variable may be set to the timestamp of $E_T$ (block 630). Web access system 160 may select a list associated with a user and devices from the groups of lists generated for the logged DNS queries and may start processing the list. The $E_1$ pointer may be set to the first DNS request in the list and the $E_T$ pointer may be set to $E_1$, indicating that the first DNS request in the list corresponds to the top domain DNS request for the list. The BeginPageTime variable may be used to compute an adjusted maximum page load time (explained below with reference to FIG. 7) and may correspond to the beginning time for rendering the web page associated with the top domain DNS request. The counter may measure the total number of web page requests for the device/user and may be incremented each time a new top domain DNS request is designated.

A next DNS request from the list may be selected and $E_2$ may be set to the next DNS request (block 635) and a determination may be made as to whether $E_2$=NULL (block 640). For example, web access system 160 may point $E_2$ to the next DNS request in the list and may determine whether $E_2$ corresponds to a NULL value. If there are no more DNS entries in the list, then $E_2$ will point to a NULL value, indicating that the previous DNS request processed was the last DNS request in the selected list. If $E_2$=NULL (block 640—YES), processing of the selected list may be completed and processing may return to block 625 to select a next list, associated with another user/device of customer premises 110.

If $E_2$ does not equal NULL (block 640—NO), processing may continue to set $T_1$ to the timestamp of $E_1$ and to set $T_2$ to the timestamp of $E_2$ (block 645) and to determine whether the difference between $T_2$ and $T_1$ is greater than the maximum page load time (block 650). For example, web access system 160 may determine whether the difference between the timestamps for the DNS entries to which $E_1$ and $E_2$ point is greater than the maximum page load time If it is determined that the difference between the two timestamps is less than or equal to the maximum page load time (block 650—NO), processing may continue to set $E_1$=$E_2$ and to set an EndPageTime variable to the timestamp of $E_1$ (block 665). In other words, the current DNS request (to which $E_2$ points) is set as the previous DNS request (to which $E_1$ points) to prepare the processing for the next DNS request on the list. The EndPageTime variable may be used to compute an adjusted maximum page load time (explained below with reference to FIG. 7) and may correspond to the ending time for rendering the web page associated with the top domain DNS request.

Furthermore, if $E_1$ does not equal $E_T$, then the DNS request to which $E_1$ points is added to the domain shard list of $E_T$ (block 670). In other words, if the previously processed DNS request (to which $E_1$ points) is not the same as the top domain DNS request, the previously processed DNS request is added to the domain shard list of the top domain DNS request associated with $E_T$. Processing may return to block 635 to select the next DNS entry in the selected list.

If it is determined that the difference between the two timestamps is greater than the maximum page load time (block 650—YES), a new top domain query may be designated and $E_2$ may be assigned to $E_T$ (block 655). For example, web access system 160 may create a new domain shard list associated with the DNS request to which $E_2$ points, since the time difference from the previously processed DNS request is greater than the maximum page load time, indicating that a new web page request was generated by the user. Furthermore, the maximum page load time may be adjusted (block 660) and processing may proceed to block 665. Adjusting the maximum page load time is described below with reference to FIG. 7.

Figure 7:
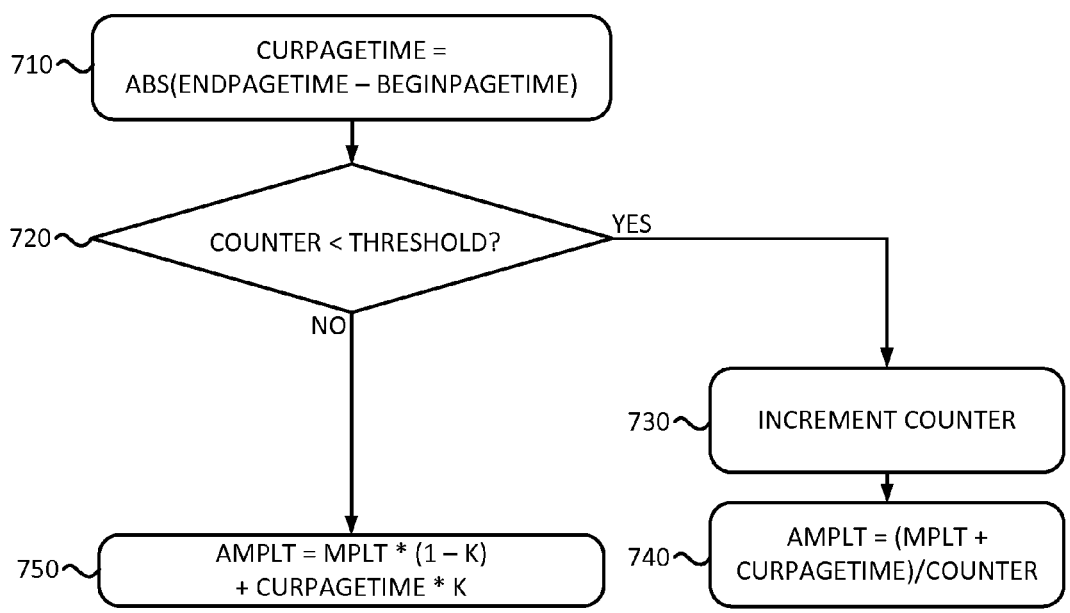
FIG. 7 is a flowchart of a process for calculating an exponential moving average according to an implementation described herein.

FIG. 7 is a flowchart of a process for calculating an exponential moving average according to an implementation described herein. In some implementations, the process of FIG. 7 may be performed by web access system 160, either individually or in combination with one or more other devices. In other implementations, some or all of the process of FIG. 7 may be performed by another device or a group of devices separate from these devices. For example, some or all of the blocks of process of FIG. 7 may be performed by base station 155, NT 112, and/or access device 114.

The process of FIG. 7 may include calculating a current page time as the absolute difference between the beginning page time and the ending page time (block 710). The CurPageTime variable may store the value for the current page load time and may be calculated based on CurPageTime=ABS(EndPageTime−BeginPageTime). The EndPageTime variable may correspond to the timestamp of the last domain shard DNS request and the BeginPageTime variable may correspond to the timestamp of the top domain shard DNS request. Thus, the current page time may approximate the time that it took the browser to load the web page by requesting all the domain shard content to be included in the web page.

A determination may be made as to whether the counter is less than a threshold (block 720). The counter may count the number of web page requests. For a first N number of web page requests, a simple average may be computed to determine the maximum page load time. After N number of web page requests, an exponential moving average (EMA) may be computed. As an example, N may be set to 20, indicating that an EMA will start to be computed after 20 web page requests. In other examples, N may be set to a different value.

An EMA may be computed so that the weight of older data points decrease exponentially over time. The EMA may be applied to computing the maximum page load time because the time to load a web page, including the loading of all the domain shard content, may vary over time due to changes in technology used by web server 180 and/or domain shard servers 190, such as the speed of the connection to network 150, the speed at which requests are processed, the speed at which the browser application operated, etc. Thus, as the technology changes over time, the EMA assigns lower weights to older web page loading times and higher weights to recent web page loading times. The EMA of the maximum page load time functions as a low pass filter by removing any sudden effects of outlier web page loading times that may occur as a result of network or server device load conditions. Furthermore, the EMA may be efficient to compute, as it does not require maintaining a history of previous web page load times.

Returning to FIG. 7, if the counter is less than the threshold (block 720—YES), the counter may be incremented (block 730) and a simple moving average may be calculated to determine an adjusted maximum page load time (block 730). The adjusted maximum page load time (AMPLT) may be calculated as the current maximum page load time (MPLT) plus the current page time (CURPAGETIME) divided by the counter. If the counter is greater than the threshold (block 730—NO), the EMA may be calculated to determine an adjusted maximum page load time (block 740). The adjusted maximum page load time (AMPLT) may be calculated as the current page load time multiplied by (1−k) plus the current page time (CURPAGETIME) multiplied by k. The variable k holds an exponent factor and may be assigned a value between 0 and 1.

FIG. 8 is an exemplary signal flow diagram 800 according to an implementation described herein. Signal flow 800 may include mobile device 130 making a DNS request for web page associated with web server 180-A to web access system 160 (signal 810) via a WiFi access point in access device 114, NT 112, and serving office 140 (not shown in FIG. 8) after a user enters a web page name into a browser, clicks on a link, or activates an application that requests to access the web page.

Web access system 160 may record the DNS request and may respond to the DNS request by resolving the DNS request to the IP address associated with web server 180-A and providing a DNS response to mobile device 130 (signal 812). Mobile device 130 may then send an HTTP request to web server 180-A using the resolved IP address to request the web page (signal 814). Web server 180-A may, in response, return the requested web page (signal 816). The web page may include instructions for fetching content from domain shard servers 190-A, 190-B, and 190-C.

The browser running on mobile device 130 may, in response send a domain shard DNS request to web access system 160 (signal 818) and web access system 160 may record the DNS request and may respond to the DNS request by resolving the DNS request to the IP address associated with domain shard server 190-A and providing a DNS response to mobile device 130 (signal 820). Mobile device 130 may then send an HTTP request to domain shard server 190-A using the resolved IP address to request the domain shard content (signal 822). Domain shard server 190-A may, in response, return the requested content (signal 824).

Similarly, mobile device 130 may send a domain shard DNS request to web access system 160 (signal 826) and web access system 160 may record the DNS request and may respond to the DNS request by resolving the DNS request to the IP address associated with domain shard server 190-B and providing a DNS response to mobile device 130 (signal 828). Mobile device 130 may then send an HTTP request to domain shard server 190-B using the resolved IP address to request the domain shard content (signal 830). Domain shard server 190-B may, in response, return the requested content (signal 832).

Furthermore, mobile device 130 may send a domain shard DNS request to web access system 160 (signal 834) and web access system 160 may record the DNS request and may respond to the DNS request by resolving the DNS request to the IP address associated with domain shard server 190-C and providing a DNS response to mobile device 130 (signal 836). Mobile device 130 may then send an HTTP request to domain shard server 190-C using the resolved IP address to request the domain shard content (signal 838). Domain shard server 190-C may, in response, return the requested content (signal 840). Mobile device 130 may now be able to render the requested web page, including the content received from domain shard servers 190-A, 190-B, and 190-C.

At a later time, the user may request another web page associated with web server 190-B. In response, mobile device 130 may send a DNS request to web access system 160 (signal 842) and web access system 160 may record the DNS request and may respond to the DNS request by resolving the DNS request to the IP address associated with web server 180-B and providing a DNS response to mobile device 130 (signal 844). Mobile device 130 may then send an HTTP request to web server 180-B using the resolved IP address to obtain the requested web page (signal 846). Web server 180-B may, in response, return the requested web page (signal 848).

Assume that web access system 160 has recorded the following timestamps for the received DNS requests: DNS1=(web server 180-A, 2015-03-01 8:05:12.100); DNS2=(domain shard server 190-A, 2015-03-01 8:05:12.250); DNS3=(domain shard server 190-B, 2015-03-01 8:05:12.300); DNS4=(domain shard server 190-C, 2015-03-01 8:05:12.500); and DNS5=(web server 180-B, 2015-03-01 8:05:15.400). Further, assume that the maximum page load time is set to 800 milliseconds. Web access system 160 may set DNS1 as the first top domain DNS request and may compare the time differences between each adjacent DNS requests: DNS2−DNS1=150 ms; DNS3−DNS2=50 ms; DNS4−DNS3=200 ms; DNS5−DNS4=2900 ms.

As a result, web access system 160 may add DNS2, DNS3, and DNS4 to the shard list of DNS1 and may designate DNS5 as a new top domain DNS request. In some implementations, the domain names of domain shards DNS2, DNS3, and DNS4 may be added to shard DB 360 to help in future identification of domain shard domain names. Thus, web access system 160 may report two web page requests: DNS1 and DNS5. Moreover, web access system 160 may calculate an adjusted maximum page load time. Assume that the counter threshold has been exceeded and web access system 160 is using an EMA to compute the adjusted maximum page load time. The current page load time for the web page associated with DNS1 may be calculated as DNS4−DNS1=400 ms. Assume k has been set to 0.25. The adjusted maximum page load time may be computed as AMPLT=MPLT*(1−k)+CURPAGETIME*k=800*(1−0.25)+400*(0.25)=700 ms.

The administrator of web access system 160, and/or the provider of communication services to customer premises 110 via serving office 140, may thus be able to provide an accurate accounting of how many different web sites and/or web pages (and/or different categories of web sites and/or web pages after a categorization process is performed) were visited using the customer account associated with customer premises 110.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As an example, while series of blocks have been described with respect to FIGS. 5-7, and series of signal flows have been described with respect to FIG. 8, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a computer device, the method comprising:
    detecting, by the computer device, a plurality of Domain Name System (DNS) requests;
    determining, by the computer device, timestamps associated with the plurality of DNS requests;
    determining, by the computer device, that one or more of the plurality of DNS requests correspond to domain shard requests associated with a top domain DNS request based on the determined timestamps, wherein determining that the one or more of the plurality of DNS requests correspond to domain shard requests associated with a top domain DNS request includes:
        grouping the plurality of DNS requests into one or more lists based on devices from which the plurality of DNS requests were received;
        sorting particular ones of the one or more lists based on the timestamps associated with the plurality of DNS requests;
        selecting a list of the one or more lists;
        designating a first DNS request from the selected list as the top domain DNS request;
        selecting a next DNS request from the selected list;
        determining whether a first timestamp, associated with the first DNS request, and a second timestamp associated with the next DNS request, differ by less than a threshold page load time;
        adding the next DNS request to a domain shard list for the top domain DNS request, in response to determining that the first timestamp and the second timestamp differ by less than the threshold page load time; and
    reporting, by the computer device, the one or more of the plurality of DNS requests as associated with the top domain DNS request based on the one or more of the plurality of DNS requests corresponding to the domain shard requests associated with the top domain DNS request.

2. The method of claim 1, further comprising:
    designating the next DNS request as a next top domain DNS request, in response to determining that the first timestamp and the second timestamp differ by greater than the threshold page load time; and
    adjusting the threshold page load time.

3. The method of claim 2, wherein adjusting the threshold page load time includes:
    determining whether a DNS request counter is less than a counter threshold; and
    computing a simple moving average for the threshold page load time to determine an adjusted threshold page load time, in response to determining that the DNS request counter is less than the counter threshold.

4. The method of claim 2, wherein adjusting the threshold page load time includes:
    computing an exponential moving average for the threshold page load time to determine an adjusted threshold page load time.

5. The method of claim 1, further comprising:
    initializing the threshold page load time to 800 milliseconds.

6. The method of claim 1, wherein the plurality of DNS requests are received from a same customer premises location.

7. The method of claim 1, wherein the computer device is configured to resolve the plurality of DNS requests into Internet Protocol addresses.

8. The method of claim 1, wherein the domain shard requests are used to fetch content to be displayed in a web page associated with the top domain DNS request.

9. A computer device comprising:
    a memory storing instructions executable by a processor; and
    the processor configured to execute the instructions to:
        detect a plurality of Domain Name System (DNS) requests;
        determine timestamps associated with the plurality of DNS requests;
        determine that one or more of the plurality of DNS requests correspond to domain shard requests associated with a top domain DNS request based on the determined timestamps, wherein, when determining that the one or more of the plurality of DNS requests correspond to domain shard requests associated with a top domain DNS request, the processor is further configured to execute the instructions to:
group the plurality of DNS requests into one or more lists based on devices from which the plurality of DNS requests were received;
sort particular ones of the one or more lists based on the timestamps associated with the plurality of DNS requests;
select a list of the one or more lists;
designate a first DNS request from the selected list as the top domain DNS request;
select a next DNS request from the selected list;
determine whether a first timestamp, associated with the first DNS request, and a second timestamp associated with the next DNS request, differ by less than a threshold page load time;
add the next DNS request to a domain shard list for the top domain DNS request, in response to determining that the first timestamp and the second timestamp differ by less than the threshold page load time; and
store the one or more of the plurality of DNS requests as associated with the top domain DNS request based on the one or more of the plurality of DNS requests corresponding to the domain shard requests associated with the top domain DNS request.

10. The computer device of claim 9, wherein the processor is further configured to:
designate the next DNS request as a next top domain DNS request, when the first timestamp and the second timestamp differ by greater than the maximum threshold page load time; and
adjust the threshold page load time.

11. The computer device of claim 10, wherein adjusting the threshold page load time, the processor is further configured to:
determine whether a DNS request counter is less than a counter threshold; and
compute a simple moving average for the threshold page load time to determine an adjusted threshold page load time, when the DNS request counter is less than the counter threshold.

12. The computer device of claim 10, wherein adjusting the threshold page load time, the processor is further configured to:
compute an exponential moving average for the threshold page load time to determine an adjusted threshold page load time.

13. The computer device of claim 9, wherein the domain shard requests are used to fetch content to be displayed in a web page associated with the top domain DNS request.

14. A non-transitory computer-readable memory device storing instructions executable by one or more processors, the non-transitory computer-readable memory device comprising:
one or more instructions to detect a plurality of Domain Name System (DNS) requests; one or more instructions to determine timestamps associated with the plurality of DNS requests;
one or more instructions to determine that one or more of the plurality of DNS requests correspond to domain shard requests associated with a top domain DNS request based on the determined timestamps, wherein the one or more instructions to determine that the one or more of the plurality of DNS requests correspond to domain shard requests associated with a top domain DNS request further include:
one or more instructions to group the plurality of DNS requests into one or more lists based on devices from which the plurality of DNS requests were received;
one or more instructions to sort particular ones of the one or more lists based on the timestamps associated with the plurality of DNS requests;
one or more instructions to select a list of the one or more lists; one or more instructions to designate a first DNS request from the selected list as the top domain DNS request;
one or more instructions to select a next DNS request from the selected list one or more instructions to determine whether a first timestamp, associated with the first DNS request, and a second timestamp associated with the next DNS request, differ by less than a threshold page load time;
one or more instructions to add the next DNS request to a domain shard list for the top domain DNS request, in response to determining that the first timestamp and the second timestamp differ by less than the threshold page load time; and
one or more instructions to identify the one or more of the plurality of DNS requests as associated with the top domain DNS request based on the one or more of the plurality of DNS requests corresponding to the domain shard requests associated with the top domain DNS request.

15. The non-transitory computer-readable memory device of claim 14, further comprising:
one or more instructions to designate the next DNS request as a next top domain DNS request, in response to determining that the first timestamp and the second timestamp differ by greater than the threshold page load time; and
one or more instructions to determine an adjusted threshold page load time by computing an exponential moving average of the threshold page load time.

16. The non-transitory computer-readable memory device of claim 14, further comprising:
one or more instructions to designate the next DNS request as a next top domain DNS request, in response to determining that the first timestamp and the second timestamp differ by greater than the threshold page load time; and
one or more instructions to adjust the threshold page load time.

17. The non-transitory computer-readable memory device of claim 16, wherein the one or more instructions to adjust the threshold page load time include:
one or more instructions to determine whether a DNS request counter is less than a counter threshold; and
one or more instructions to compute a simple moving average for the threshold page
load time to determine an adjusted threshold page load time, in response to determining that the DNS request counter is less than the counter threshold.

18. The non-transitory computer-readable memory device of claim 14, further comprising:
one or more instructions to initialize the threshold page load time to 800 milliseconds.

19. The non-transitory computer-readable memory device of claim 14, wherein the plurality of DNS requests are received from a same customer premises location.

20. The non-transitory computer-readable memory device of claim 14, wherein the domain shard requests are used to fetch content to be displayed in a web page associated with the top domain DNS request.

* * * * *